United States Patent [19]
Kamimura et al.

[11] Patent Number: 5,264,709
[45] Date of Patent: Nov. 23, 1993

[54] STEERING CONTROL SYSTEM FOR MOVING VEHICLE

[75] Inventors: Kenji Kamimura; Sadachika Tsuzuki; Toshikazu Nakamura, all of Saitama, Japan

[73] Assignee: Honda Giken Kogyo Kabushiki Kaisha, Tokyo, Japan

[21] Appl. No.: 990,403

[22] Filed: Dec. 14, 1992

[30] Foreign Application Priority Data

Dec. 25, 1991 [JP] Japan .................................. 3-357225

[51] Int. Cl.⁵ .......................................... G01N 21/86
[52] U.S. Cl. ..................................... 250/561; 180/169
[58] Field of Search ............... 250/202, 561; 356/141, 356/152, 1, 4; 180/167, 168, 169

[56] References Cited
U.S. PATENT DOCUMENTS 5,066,854 11/1991 Meyer et al. ..................... 250/202
5,170,350 12/1992 Kamimura et al. ................. 180/169

Primary Examiner—David C. Nelms
Attorney, Agent, or Firm—Pollock, VandeSande and Priddy

[57] ABSTRACT

A steering control system for calculating straight lines connecting reference points which are set at at least three positions around a work area, detecting the advance direction of a moving vehicle placed at a travel start position and the relative angles thereof with respect to the respective straight lines, and selecting as a reference line a particular one of the respective straight lines for which the relative angle is close to a preset particular angle. The moving vehicle is caused to travel a plurality of straight courses extending in a predetermined direction relative to the reference line and placed at predetermined intervals, and to travel transfer courses for moving from one to another of the straight courses.

9 Claims, 9 Drawing Sheets

STEERING CONTROL SYSTEM FOR MOVING VEHICLE

BACKGROUND OF THE INVENTION

1. Field of the Invention

The present invention is related to a steering control system for a moving vehicle, and particularly to a steering control system for various moving vehicles such as mobile machines used for agricultural and civil engineering works, and automatic transporters used in a factory.

2. Description of the Prior Art

A control system is known in which, by causing a moving vehicle to travel in an area for a work (hereinafter, referred to as a work area), a predetermined work is done by the working machine equipped on the moving vehicle. In this system, the location of the moving vehicle in the work area is detected and detected positional data is compared with a preset traveling course. Based on the comparison result, the moving vehicle is steered to correct the difference between the current position of the moving vehicle and the traveling course. This control system requires means for detecting the current position of the moving vehicle.

As the means for detecting the current position of a moving vehicle, for instance, there is an apparatus proposed in the Japanese Patent Kokai Publication No. 59-67476 official gazette. This apparatus has means for circularly scanning a light beam around the moving vehicle, and light receiver means. The light beam is projected from the moving vehicle to light reflector means placed at at least three reference positions apart from the moving vehicle. The light reflector means reflect light to the direction of incidence, and the light beam reflected is detected by the light receiver means. Based on the light beam detection signal, the differential azimuths between the respective light reflector means as viewed From the moving vehicle are detected, and the position of the moving vehicle is calculated based on the differential azimuths and the positional information of the light receiver means or the reference points.

However, to make the moving vehicle travel to perform a predetermined work, a traveling course must be first set in a work area. For instance, in the conventional control systems described in U.S. Pat. No. 5,011,288 and the Japanese Patent Kokai Publication No. 2-19293 official gazette, a traveling course is set so that the traveling course comprises a plurality of straight courses which are set perpendicular to the straight line connecting particular two of the plural reference points provided around a work area, and turn courses for moving from one of the straight courses to the adjacent straight course. And the control system controls the moving vehicle so that it travels along the predetermined traveling course. That is, the direction of the straight courses set in the work area is preset by the operator on the basis of the straight line connecting two particular reference points, and the direction of the moving vehicle is set in conformity with the direction of the preset course.

Also, in the Japanese Patent Kokai Publication No. 64-82206 official gazette, a system for controlling the traveling of an unmanned moving vehicle is described in which the teaching of a work area including reference points is performed or a work start position or traveling course is set each time the work area is changed.

The conventional control systems had the following problems.

The work area in which the moving vehicle travels takes various shapes according to works, and there are few work area with simple shapes. The automatic traveling system of this type is characterized in that the traveling extent and traveling course can freely be set or changed according to the size or shape of the work area, whereas it is required to perform the teaching of the work area including reference points on which the traveling is based, or the setting of a work start position or traveling course each time the work area is changed.

In the control systems described in the above U.S. Pat. No. 5011288 and Japanese Patent Kokai Publication No. 2-19293 official gazette, each time the work area is changed, the operator needs to first input the extent, reference points and traveling course, and this is a very cumbersome work.

A proposal for improving such cumbersome work is described, for instance, in the Japanese Patent Kokai Publication No. 64-82206 official gazette, but a portable keyboard input system including a monitor and the like, or a portable handwriting-recognition system is required for teaching. The keyboard input system has a problem that operator training is not easy and not everybody can easily handle it. In the handwriting-recognition system, enough accuracy cannot be obtained if a wide work area is indicated on a small piece of paper or pad, and thus the portable handwriting-recognition system needs considerably high accuracy. As a result, there is a problem that the traveling control system has a large-scale configuration and it is difficult to automatize the work with a simple operation.

SUMMARY OF THE INVENTION

It is the object of the present invention to provide a steering control system for a moving vehicle wherein, even if the operator only sets the moving vehicle at a travel start position with a rough feeling of direction, a traveling course enabling an effective traveling can automatically be selected on the basis of the set advance direction, and the moving vehicle can be made to travel in the work area along the selected course.

The present invention is characterized by comprising means for calculating the straight lines connecting the light reflector means placed at the reference points which are set at at least three positions around a work area, means for detecting the advance direction of a moving vehicle placed at a travel start position and the relative angles thereof with respect to the respective straight lines, and selecting means for selecting as a reference line a particular one of the respective straight lines for which the relative angle is close to a preset particular angle, wherein the moving vehicle is caused to travel a plurality of straight courses extending in a predetermined direction relative to the reference line and placed at predetermined intervals, and to travel transfer courses for moving from one to another of the straight courses.

In the present invention, when a moving vehicle is placed in a work area for expected work, a traveling course enabling an efficient traveling is automatically determined on the basis of its advance direction.

DETAILED DESCRIPTION OF THE PREFERRED EMBODIMENT

Figure 2:
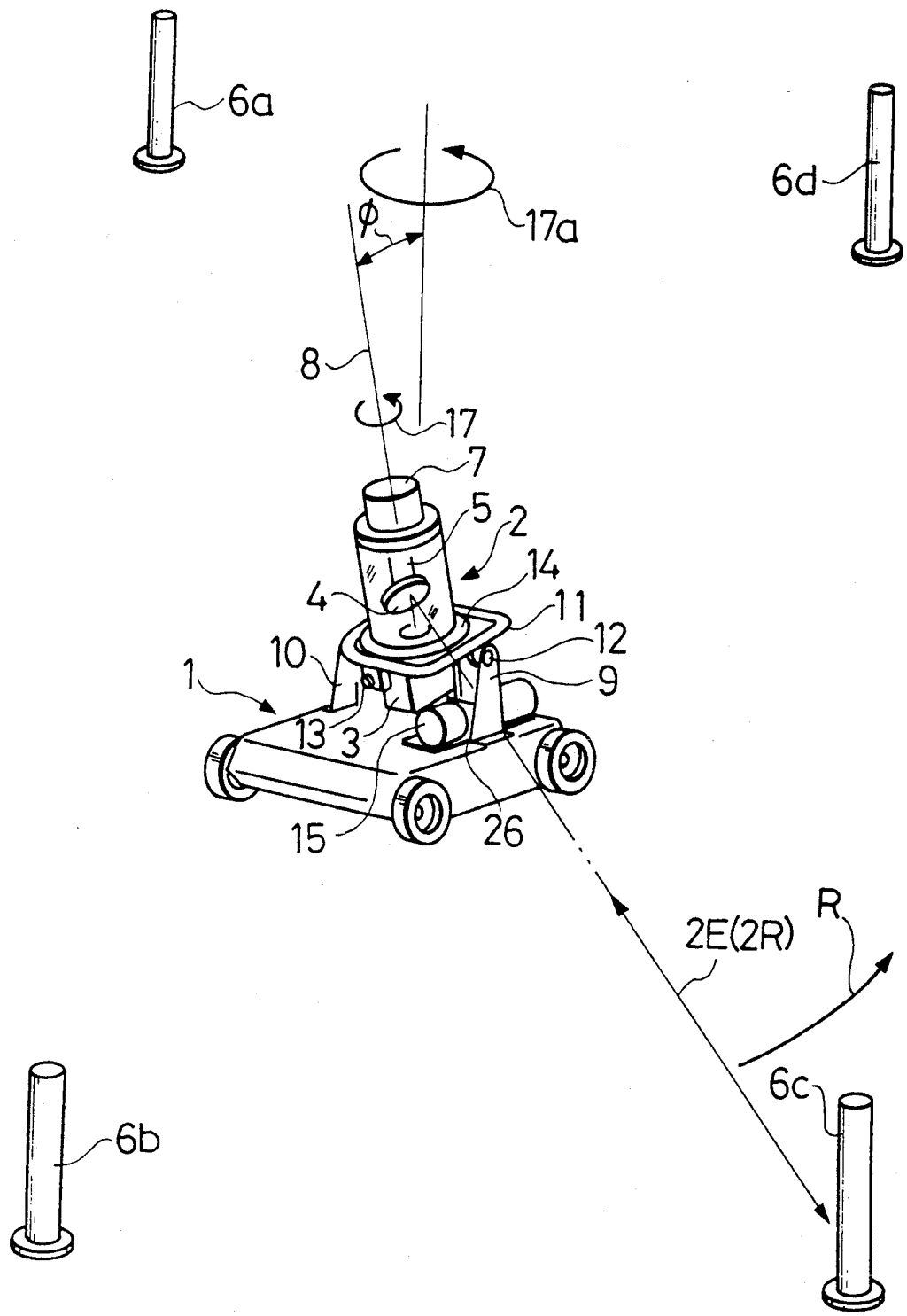
FIG. 2 is a perspective view showing the traveling state of a moving vehicle.

Now, an embodiment of the present invention is described with reference to the drawing. FIG. 2 is a view showing the embodiment of the present invention, a perspective view of a moving vehicle traveling in a work area. Light reflectors 6a-6d are placed along substantially the outer perimeter of the work area in which a moving vehicle 1 is caused to travel to perform a predetermined work. Well-known retroreflector means such as a corner cube prism is used as the reflecting surface of each reflectors 6a-Gd, and the light incident upon the reflecting surface is reflected to the direction of incidence.

Moving vehicle 1 is, for instance, a lawn mower having a cutter blade for lawn mowing (not shown) on the underside of it. Light beam scanner 2 is mounted on the top of moving vehicle 1. Scanner 2 has a light emitter (not shown) for emitting light beam 2E, and a light receiver (now shown) for receiving reflected light 2R reflected at reflectors Ga-6d. For instance, the light emitter may be a light emitting diode and the light receiver may be a photo diode, and they are received in a casing 3.

The light beam emanating from the light emitter is perpendicularly reflected at a mirror 4 to make a change of direction, and projected out of the scanner 2. Mirror 4 is rotated by motor 5 around central axis of rotation 8 as shown by an arrow 17a, and as a result, light beam 2E is scanned in the direction indicated by an arrow R. The direction in which light beam 2E is projected, which is represented by the rotational position of mirror 4, is detected according to the output signal of encoder 7 coupled to motor 5.

Scanner 2 is supported on moving vehicle 1 by a gimbal-type procession mechanism. The precession mechanism has outer ring member (hereinafter simply referred to as outer ring) 11 and inner ring member (hereinafter referred to as inner ring) 14. Outer ring 11 is journaled for oscillation with respect to brackets 9 and 10 by shaft 12 and another shaft, not shown, which is provided at the position opposed to the shaft 12. On the other hand, inner ring 14 is journaled for oscillation with respect to outer ring 11 by shaft 13 and another shaft, not shown, which is provided at the position opposed to the shaft 13. The central axes of oscillation of outer ring 11 and inner ring 14 are right-angled with each other.

The gimbal-type precession mechanism is driven by motor 15. Scanner 2 is attached to the gimbal-type precession mechanism with the central axis of rotation 8 of mirror 4 being inclined by an angle $\phi$ from the vertical, and the inclination direction continuously varies as the gimbal-type precession mechanism is driven by the motor 15. That is, scanner 2 rotates in the direction of arrow 17a. As scanner 2 rotates, central axis of rotation 8 draws a conical surface. By the precession of scanner as described above, light beam 2B is rotatively scanned around central axis of rotation 8 while the projection angle of the light beam or the angle from the horizontal continuously varies, whereby the light beam is also continuously oscillatory-scanned in the upward and downward directions.

Figure 3:
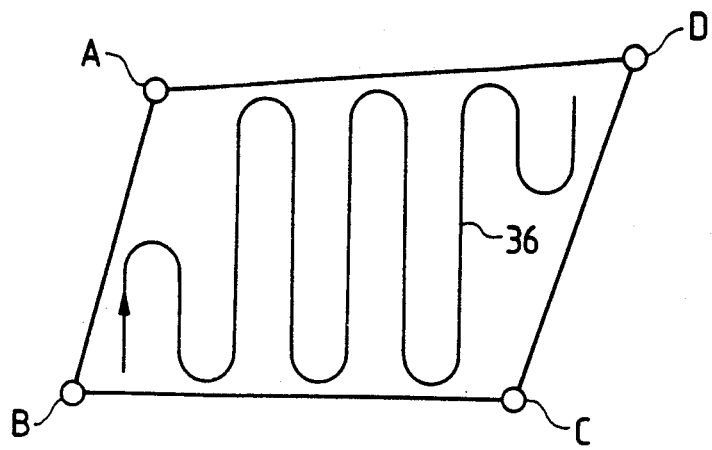
FIG. 3 is an illustration of a work area showing an example of straight courses perpendicular to the reference line.
Figure 4:
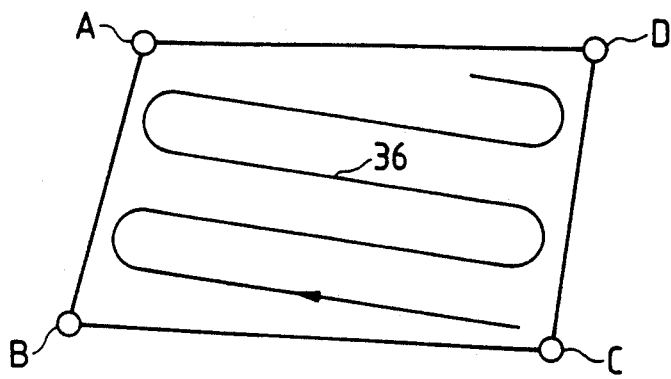
FIG. 4 is an illustration of a work area showing another example of straight courses perpendicular to the reference line.
Figure 5:
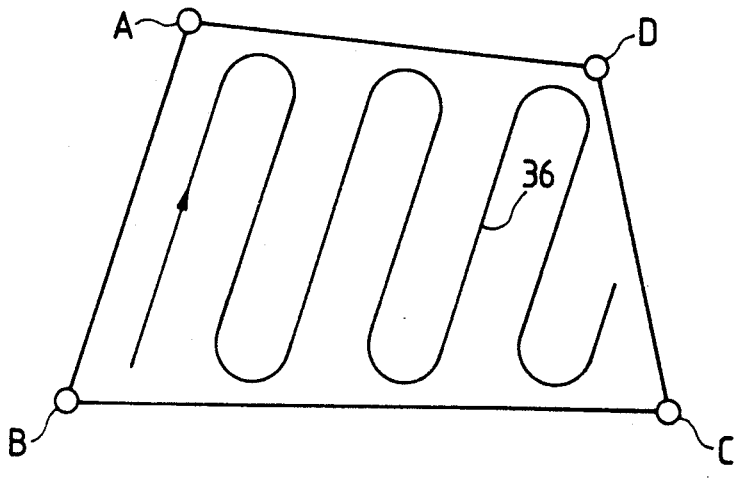
FIG. 5 is an illustration of the work area showing an example of straight courses parallel with the reference line.

Now, the method for setting the traveling course of moving vehicle 1 is outlined. FIGS. 3 to 5 are illustrations each showing an example of a traveling course set in a work area. In FIGS. 3 to 5, the work area is defined by reference points A-D. The reflectors 6a-6d are respectively placed at the respective reference points A-D. In this embodiment, when moving vehicle 1 is set in the work area and made to perform a necessary work, flexibility can be provided to the advance direction of the moving vehicle 1 placed in the work area. That is, depending on the setting of the advance direction of the moving vehicle 1 or the straight-traveling direction of moving vehicle 1 when the vehicle 1 is set in the work area, traveling courses different from each other as shown in FIGS. 3 to 5 are established according to a predetermined rule.

For setting the traveling course relative to the lines AB, BC, CD and DA which are defining the work area, the one line which forms an angle, with respect to the advance direction, that is closest to a predetermined angle is first selected as the reference line. Based on that selected line, a traveling course 36 as shown in any one of FIGS. 3 to 5 is set.

If it is predetermined that the line which forms an angle closest to 90 degrees with respect to the advance direction is defined as the reference line and the straight courses are set perpendicular to the reference line, a traveling course as shown in FIG. 3 or 4 is set. If it is predetermined that the line which forms an angle closest to 0 or 180 degrees with respect to the advance direction is defined as the reference line and straight courses parallel with the reference line are set, that is, if the line which is more parallel with the advance direction is defined as the reference line, then a traveling course 36 as shown in FIG. 5 is set.

FIG. 3 is an example in which line BC is selected as the reference line and the straight courses are set perpendicular to the reference line BC, and FIG. 4 is an example in which line CD is selected as the reference line and the straight courses are set perpendicular to the reference line CD. FIG. 5 is an example in which line AB is selected as the reference line and the straight courses are set parallel with the reference line AB.

Traveling course 36 is desirably set so that it does not run over the work area. For this purpose, in this embodiment, a limit line is set inside contour lines connecting the respective reference points A-D and at a predetermined distance from the contour lines, and turn courses for moving from one straight course to another straight course are set within the region between the limit line and the contour lines.

Figure 6:
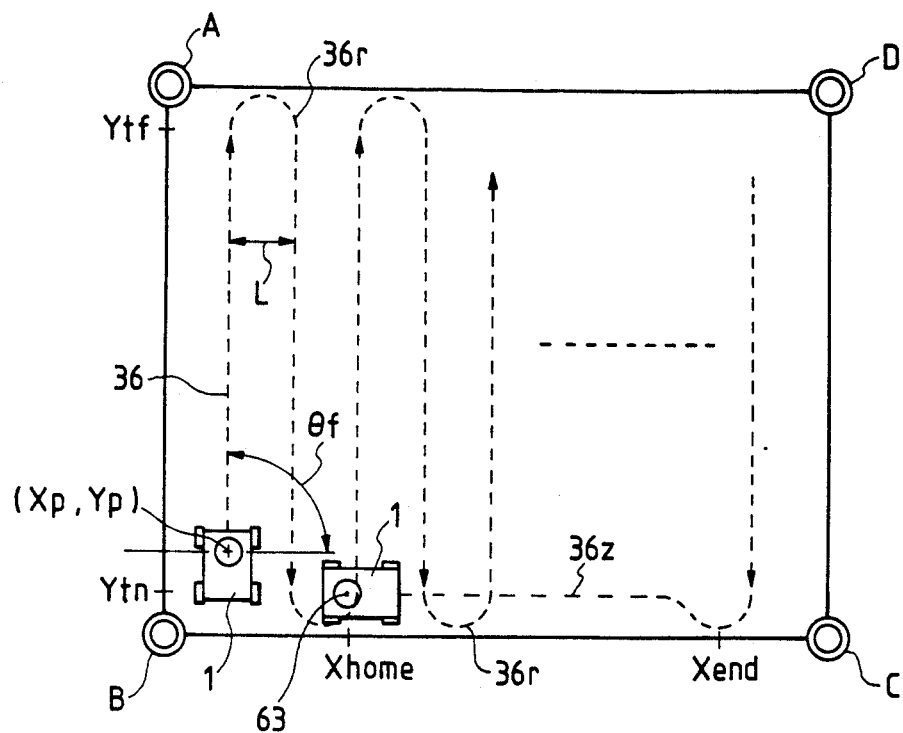
FIG. 6 is an illustration showing an arrangement of a traveling course and reflectors.
Figure 9A:
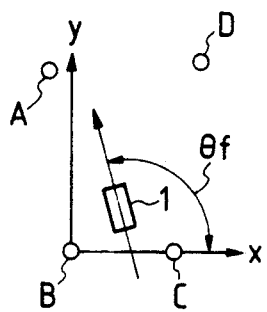
FIGS. 9A to 9D are illustrations showing different types of the reference coordinate, respectively.
Figure 9B:
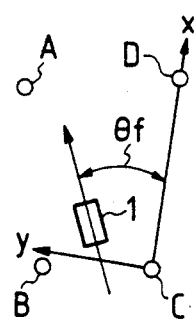
Figures 9C, 9D:
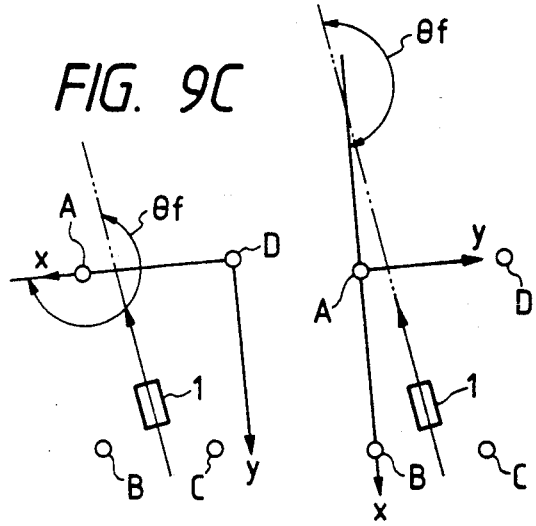

An example of the steering control of moving vehicle 1 is described below. FIG. 6 is an illustration showing the positional relationship between moving vehicle 1 and reference points A-D, and moving vehicle 1 travels along the traveling course 36 set in the work area to perform a predetermined work such as lawn mowing. Prior to the work, the positions of reference points A-D are firstly detected and input to the control system of moving vehicle 1.

The light beam circularly scanned by scanner 2 around moving vehicle 1 is reflected by the reflectors at reference points A-D, when the reflected light is detected, the incident angle (azimuth) of the reflected light is detected and based on the output signal of the encoder 7. In the control system, the position of moving vehicle 1 is calculated on the basis of the azimuths and the positional information (coordinates) of reference points A-D. The current position and traveling course 36 are compared, and the steering angle of moving vehicle 1 is controlled to cancel the difference between them, or deviation of the current position from the traveling course. Hereinafter, the current position of moving vehicle 1 is represented by coordinate values (Xp, Yp), and the advance direction of moving vehicle 1 is represented by angle $\theta f$ on the basis of the x-coordinate axis, or line BC in the example shown in FIG. 6.

When moving vehicle 1 is first set near reference point B. it travels the traveling course 36 which is set according to the setting direction, and returns to home position 63 through final course 36z. In the example of FIG. 6, plurality of straight courses are set perpendicular to reference line BC, and the individual straight courses are connected by turn courses 36r.

After traveling a straight course, moving vehicle 1 travels a turn course at a position at which the y-coordinate has exceeded Ytf or become smaller than Ytn, moving to the adjacent next straight course. In this embodiment, moving vehicle 1 travels a turn course with its steering angle being fixed to a constant value. If the x-coordinate of a straight course has exceeded Xend, the moving vehicle 1 returns to home position 63 via the final turn course and course 36z.

In FIG. 6, for simplicity, the work area was assumed to be rectangular and the straight courses were made parallel with the Y-axis on line AB. however, as described with reference to FIGS. 3 to 5, the work area is not limited to a rectangle, and the straight traveling course 36 can be set perpendicular to, parallel with, or to form any angle with respect to any of the lines connecting any two of reference points A-D.

The descriptions of principle and calculation formulas for obtaining the position of moving vehicle 1 in the above described steering control are omitted, because they are described in detail, for instance, in U.S. Pat. Nos. 5,011,288 and 4,947,324.

Figure 7A:
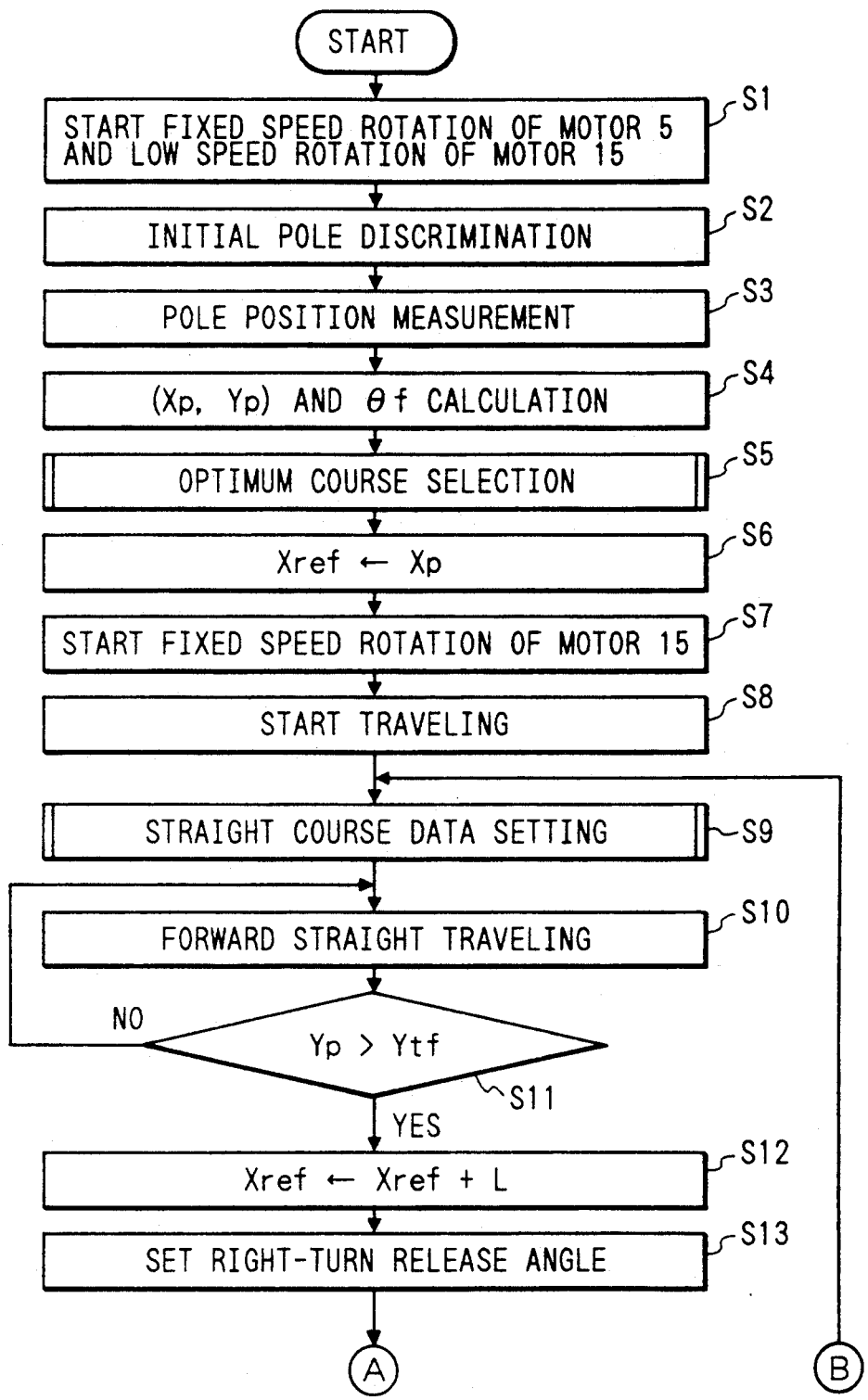
FIGS. 7A and 7B taken together are a general flowchart showing the operation of the embodiment.
Figure 7B:
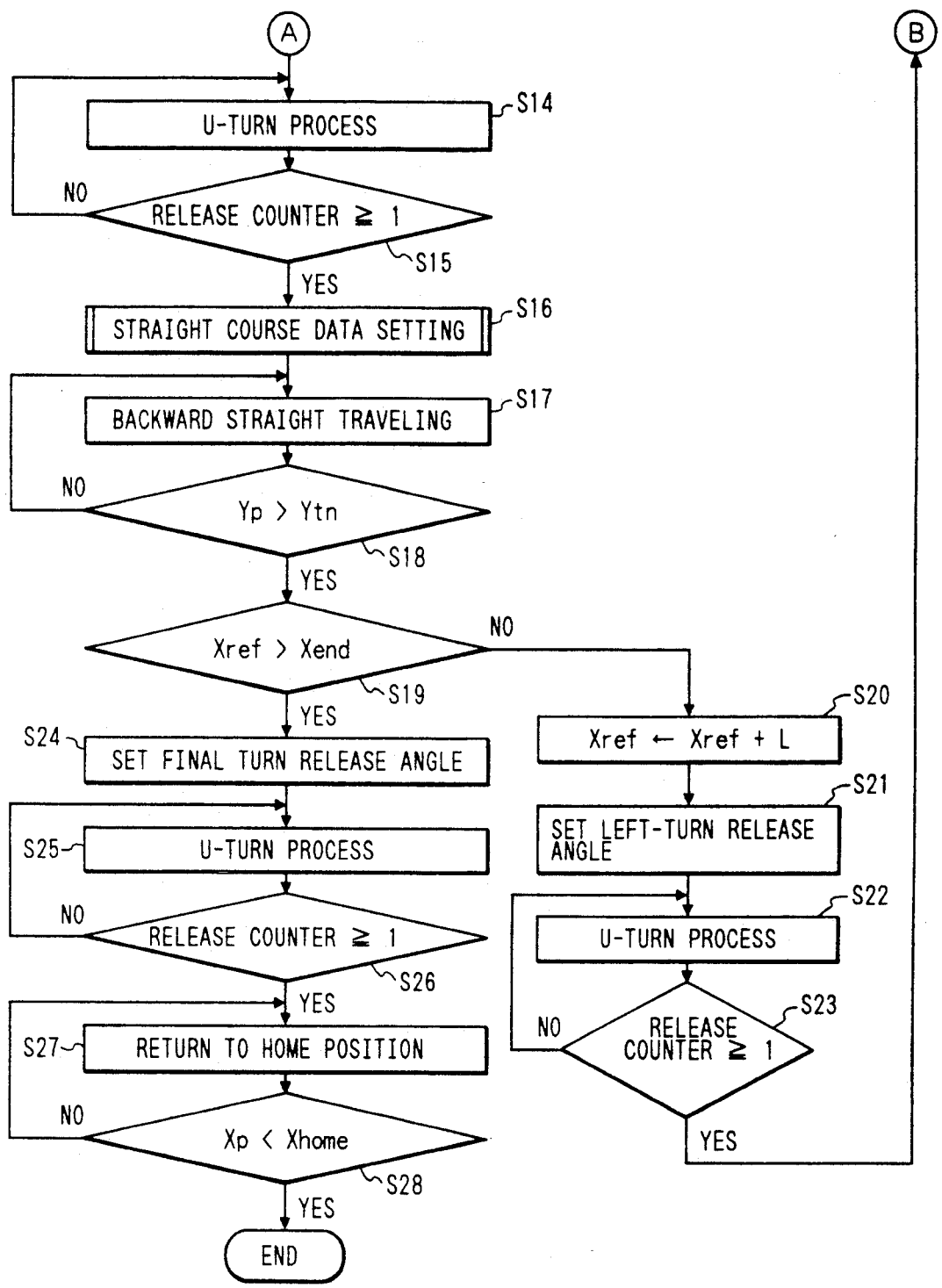

Now, referring to the flowchart of FIGS. 7A and 7B, the steering control for causing moving vehicle 1 to travel as described above is explained. In step 81, motor 5 is started up, mirror 4 is rotated around central axis of rotation 8, and motor 15 is started up to cause the central axis of rotation 8 to precess in a conic locus. As a result, light beam 2E emanating from scanner 2 is also circularly scanned while varying the angle from the horizontal (projection angle). At this stage, motor 15 is rotated at rather low speed so that the light beam can surely be applied to reflectors 6a-6d disposed at reference points A-D.

In step S2, the light reception data detected during each precession of central axis of rotation 8 is analyzed, and a discrimination process of reflectors 6a-6d disposed at the reference points, or an initial pole discrimination process is performed. In the initial pole discrimination process, if a plurality of lights are incident from substantially the same direction, these light reception data are collectively stored as one detection block. And, it is judged whether or not the number of detection blocks which were generated according to the light reception data gathered during a single precession of central axis of rotation 8 is equal to the number of the predetermined reference points (-number of reflectors). If these numbers are equal, it is determined that the detected light reception signals are the signals of the lights reflected by the reflectors at the reference points. On the other hand, if the two numbers are not equal, the number of the light reception data collected in each detection block is compared with a predetermined reference value. As a result, the data of detection blocks having more light reception data are judged to be the detection signals of the reflected lights from the reference points. If the light reception data is less than the reference value, the collection of light reception data, namely, a reflected light reception process is done again. The initial pole discrimination process is described in more detail in U.S. patent application Ser. No. 875693 filed Apr. 29, 1992, for "System for Detecting the Position of Observation Spot".

In step S3, a pole position measuring process is performed, in which each distance from moving vehicle 1 to each reference point A-D is measured to calculate the position of each reference point. The pole position measuring process is implemented as follows, for instance. Each distance to reference point A-D from the vehicle 1 is measured on the basis of the respective height (known value) of reflectors 6a-6d, and on the values representing the maximum and minimum inclination angles of central axis of rotation 8 when the lights reflected by each reflector are detected a plurality of times. The positions (coordinate values) of the reference points are calculated on the basis of the distances and the azimuths of the reference points obtained by the initial pole process. The pole position measuring process is described in more detail in the aforementioned U.S. patent application Ser. No. 875693.

In step S4, on the basis of the azimuths of the reference points calculated in step S2 and the coordinate values of the reference points calculated in step S3, the current positional coordinates (Xp, Yp) and advance direction $\theta f$ of moving vehicle 1 are calculated. At this point, the positional coordinates (Xp, Yp) and advance direction $\theta f$ may be provisionally calculated on preset reference coordinates, for instance, coordinates in which line BC is the x-axis. However, the reference coordinates may be changed depending on the result of the optimum course selecting process in step S5. That is, optimum reference coordinates are selected according to how moving vehicle 1 is placed in the work area, or according to advance direction θf.

In step S5, an optimum course selecting process is performed for selecting an optimum traveling course according to how moving vehicle 1 is set in the work area. This process is detailed with reference to FIG. 8.

In step S6, the current x-coordinate Xp of moving vehicle 1 is set as the x-coordinate Xref of the first straight course.

In step S7, motors 5 and 15 are rotated at a predetermined high speed to rotate and oscillate mirror 4. In step S8, the engine of moving vehicle 1 is coupled to the driving wheels to start the traveling thereof.

In step S9, in order to prevent moving vehicle 1 from overrunning from the work area, a straight course data setting process is performed for setting the length of the straight courses, or the upper limit value Ytf and the lower limit value Ytn of the Y-coordinate, according to the shape of the work area. The detail of this process is described later with respect to FIG. 10.

In step S10, a forward straight traveling process is performed for causing moving vehicle 1 to travel straight in the direction in which the y-coordinate value increases. In this process, the current position (Xp. Yp) and advance direction θf of moving vehicle 1 are calculated on the basis of directions of incidence (azimuths) of lights reflected by the reflectors, the difference between the calculated value and the set traveling course is calculated, and the steering control is made to correct the difference.

In step S11, according to whether or not the current y-coordinate Yp of moving vehicle 1 has exceeded its upper limit value Ytf, it is judged whether or not the moving vehicle 1 has completed the traveling of the forward straight course. If the judgment is positive, the process goes to step S12, where distance L (the distance between adjacent two straight courses) is added to the x-coordinate Xref of the straight course to set the next straight course.

In step S13, a predetermined azimuth data is set as the right-turn release angle for determining the time when the traveling of the turn course following the straight course should be terminated, thereby to prepare for the following U-turn process. In step S14, a U-turn process is performed to make a right turn with a fixed turning radius, and with the steering angle being fixed to a predetermined value.

In step S15, it is judged whether or not the time for terminating the turn of moving vehicle 1 has been reached. For this, the number of reference points for which the azimuth to viewed from moving vehicle 1 has reached the right-turn release angle is counted by a release counter in the U-turn process. In the present embodiment, according to whether or not the release counter value has been "1" or more, it is determined whether or not the turning of the vehicle 1 should be terminated. That is, the time at which the azimuth of the at least one of reference points has readied the right-turn release angle is used as the criterion for judging the timing of finishing the turning.

If the judgment in step S15 is positive, the process moves to step S16, judging that the traveling of the turn course has been completed. In step S16, a straight traveling course data setting process is performed for the next straight course. In step S17, a backward straight traveling process is performed for causing moving vehicle 1 to travel straight in the direction in which the Y-coordinate value decreases.

In step S18, according to whether or not the y-coordinate of moving vehicle 1 has become smaller than the lower limit value Ytn of the y-coordinate, it is judged whether or not the traveling of the backward straight course has been completed. If the judgment is positive, the process flows to step S19, where it is judged whether or not Xref of the straight course has exceeded the x-coordinate Xend of the point at which the work is expected to terminate. If the judgment in stop S19 is negative, stop S20 is entered to set the next straight course.

In step S21, a left-turn release angle setting process is performed for setting the time when a left turn should be terminated. In step S22, a U-turn process is performed, and in step S23, it is judged whether or not the release counter value has been "1" or more. If the judgment is positive, the process skips to step S9, judging that the traveling of the turn course has been completed.

On the other hand, the traveling of all the straight courses must be completed before the judgment in stop S19 can become positive, and then the process advances to step S24 to set the release angle in the final turn course. This is similar to the setting of the right-turn release angle or left-turn release angle.

In step S25, a U-turn process is done, and in step S26, it is judged whether or not the release counter value has been "1" or more. In step S27, moving vehicle 1 is caused to travel the straight course to return to home position 63.

In step S28, it is judged whether or not the x-coordinate Xp of moving vehicle 1 has been equal to, or smaller than the x-coordinate Xhome of home position 63, and if the Judgment is positive, it is judged that moving vehicle 1 has returned to home position 63, completing the process.

Figure 8:
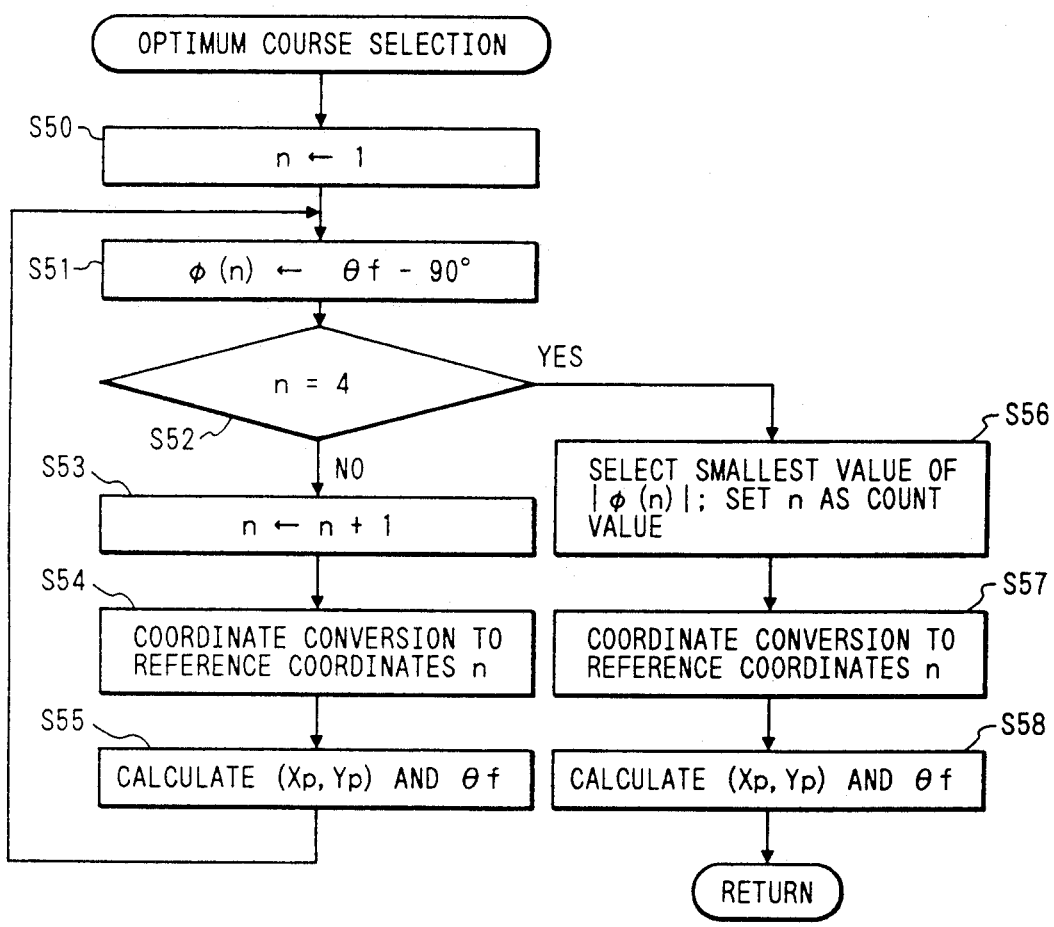
FIG. 8 is a flowchart showing an optimum course selecting process.

Subsequently, with reference to the flowchart of FIG. 8 and the illustrations of FIGS. 9A-9D for defining four different reference coordinates (1) to (4), the optimum course selecting process in step S5 will be detailed. In FIGS. 9A-9D, the moving vehicle is represented by reference numeral 1. In this process, it is judged that the advance direction θf with respect to x-axis is closest to go degrees in which one of four coordinates where lines AB, BC, CD and DA connecting two of the reference points A-D are used as the x-axis, respectively. And, on the basis of the, coordinate system selected according to the calculation result, the traveling course of moving vehicle 1 is set in the work area.

In step S50, "1" is set as a counter value n for identifying reference coordinates. The reference coordinates mean the coordinate systems in which the lines BC, CD, DA and AB are the x-axis, respectively, as shown in FIGS. 9A-9D. And these four coordinate systems in which lines BC. CD, DA and AB are the x-axis, respectively, are called reference coordinates (1)-(4).

In step S51, angle φ (n) indicating how much angle the advance direction θf of moving vehicle 1 deviates from a line perpendicular to the x-axis of the respective reference coordinates, namely (θf-90°), is calculated. In this step, starting with n=1, the deviation angle from a line perpendicular to the x-axis of the reference coordinates (1) or the line BC is calculated.

In step 852, by judging whether or not the counter value n is "4", it is judged whether or not the calculation of the deviation angle φ(n) has been completed in all the four types of reference coordinates. It is because four types of reference coordinates are set that the counter value n as a criterion is "4" in this example, and it should be understood that the counter value n as a criterion can be changed according to the number of the reference points disposed around the work area.

In step S53, the counter value n is incremented. In next step S54, the coordinates of each reference point are converted to the reference coordinates n to be processed. That is, a coordinate conversion from the reference coordinates (1) to the reference coordinates (2) is performed first.

In step S55, the current position (Xp, Yp) and advance direction $\theta f$ of moving vehicle 1 are calculated in the reference coordinates (2), or the coordinates system in which the line CD is the x-axis. When this calculation is completed, step S51 is again entered. In step S51, the deviation angle $\phi(n)$ from the x-axis of the reference coordinates (2), or a line perpendicular to the line CD, is now calculated for n=2.

If the deviation angle $\phi(n)$ has been calculated in all the reference coordinates, the judgment in step S52 becomes positive and the process flows to stop S56. In stop S56, the reference coordinates in which the absolute value of the deviation angle $\phi(n)$ indicates the smallest value is selected, and the counter value n representing the selected coordinate is set. For instance, if the deviation angle $\phi(n)$ is smallest in the reference coordinates (1), "1" is set as the counter value n.

In step S57, to use the reference coordinates detected in step S56 as the reference coordinates in the current steering control, the coordinates of each reference point are converted to the reference coordinates n.

In step S58, the current position (Xp, Yp) and advance direction $\theta f$ of moving vehicle 1 are calculated on the reference coordinates n which was determined to be the reference coordinates for steering control.

Figure 10:
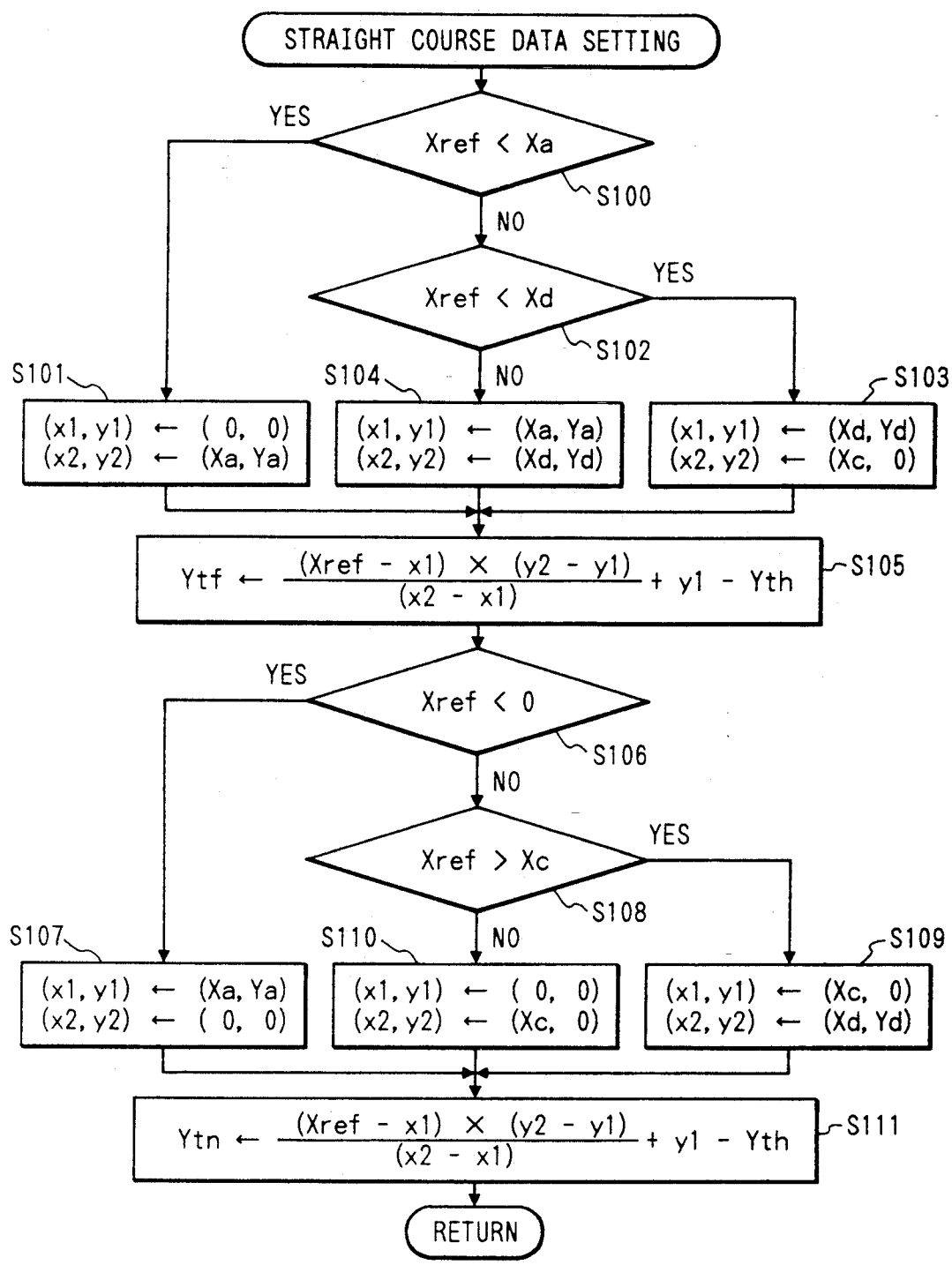
FIG. 10 is a flowchart showing a straight course setting process.

Subsequently, the straight course determining processes in steps S9 and S16 are detailed with reference to the flowchart shown in FIG. 10 and the work areas shown in FIGS. 11 and 12. In this instance, the work areas were assumed to be nearly trapezoidal. Thus, instead of rectangular work areas in which there is no change in the length of the straight courses, by assuming approximately trapezoidal ones in which the length of the straight courses changes, the intention of the description is more clarified.

Figure 11:
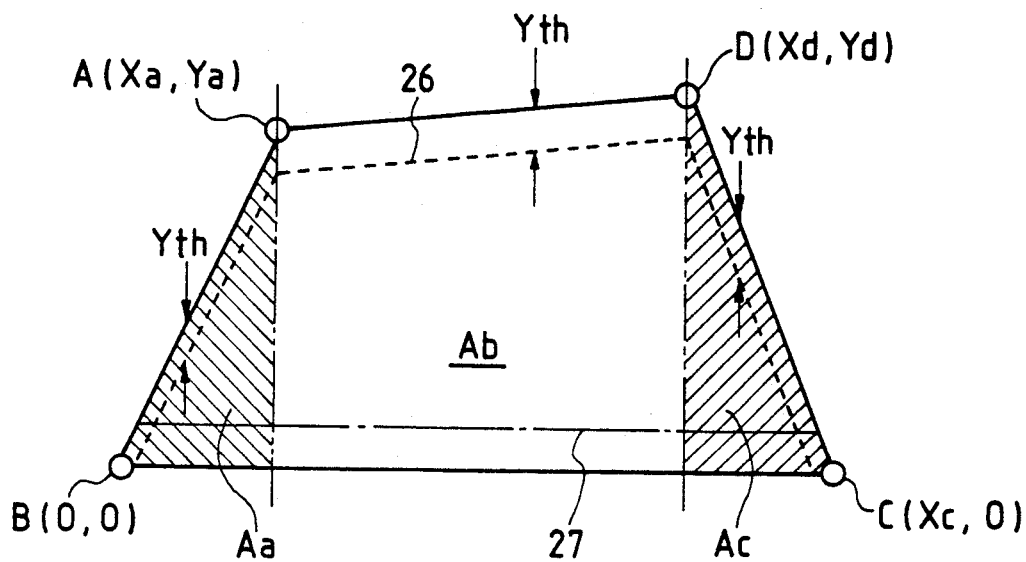
FIG. 11 is an illustration of a work area for explanation of the straight course setting process.
Figure 12:
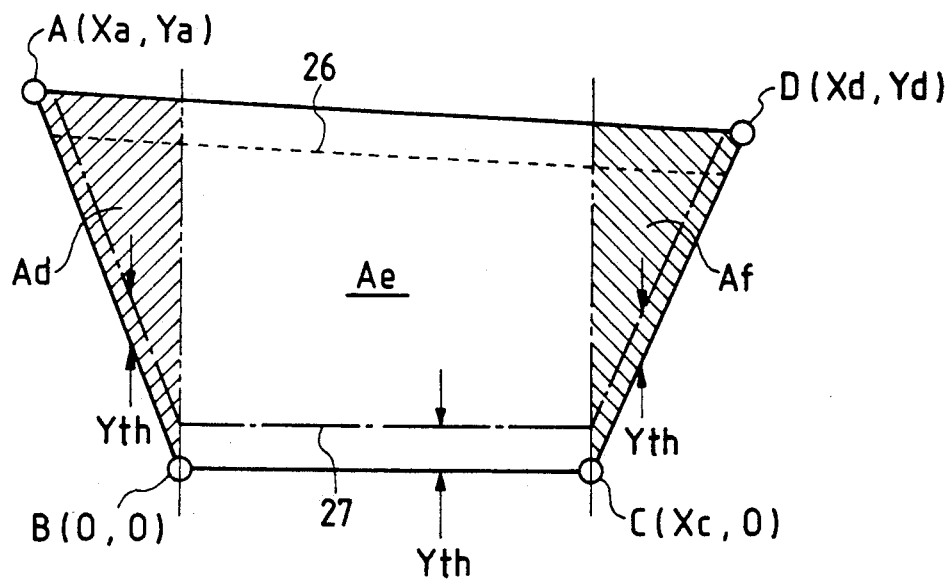
FIG. 12 is an illustration of another work area for explanation of the straight course setting process.

In FIGS. 11 and 12, dotted line 26 represents the upper limit value Ytf of the y-coordinate of straight courses that is set inside the work area at a predetermined distance Yth therefrom, and chain line 27 represents the lower limit value Ytn of the y-coordinate of the straight courses. Moving vehicle 1 starts a U-turn when it arrives at the dotted line 26 or chain line 27.

First, in stop S100, it is judged whether or not the coordinate Xref of a straight course in question is smaller than the x-coordinate Xa of reference point A. If the judgment is positive, the process goes to step S101. The judgment in step S100 becomes positive when moving vehicle 1 exists in region Aa of FIG. 11, and there is no corresponding region in the work area of FIG. 12. In stop S101, the origin of coordinates or the coordinates (0, 0) of reference point B are set in variables (x1, y1). and the coordinates (Xa, Ya) of reference point A are set in variables (x2, y2).

On the other hand, if step S100 is negative, the process skips to step S102. In step S102, it is judged whether or not the coordinate Xref of a straight course in question is greater than the x-coordinate Xd of reference point D. If step S102 is positive, the process flows to step S103. The judgment in step S100 is negative and step S102 is positive when moving vehicle 1 exists in region Ac of FIG. 11, and there is no corresponding region in the work area of FIG. 12. In step S103, the coordinates (Xd, Yd) of reference point D are set in variables (x1, Y1), and the coordinates (Xc, 0) of reference point C are set in variables (x2, y2).

If the judgment in step S102 is negative, step S104 is entered. The judgments in steps S100 and S102 are both negative when moving vehicle 1 exists in region Ab of FIG. 11 or anywhere in the work area of FIG. 12. In step S104, the coordinates (Xa, Ya) of reference point A are set in variables (x1, y1), and the coordinates (Xd, Yd) of reference point D are set in variables (x2, y2).

After the coordinate values have been set in steps S101, S103 or S104, the process goes to step S105, where the calculation formula shown in the figure is used to calculate the upper y-coordinate limit value Ytf of the straight courses.

Steps S106-S111 are processings to calculate the lower y-coordinate limit value Ytn of the straight courses. In step S106, it is judged whether or not the x-coordinate Xref of a straight course is smaller than "0". If the judgment is positive, the process moves to step S107. The judgment in stop S106 becomes positive when moving vehicle 1 exists in region Ad of FIG. 12, and there is no corresponding region in the work area of FIG. 11. In step S107, the coordinates (Xa, Ya) are set in variables (x1, y1), and the coordinates (0, 0) of the origin or reference point B are set in variables (x2, y2).

On the other hand, if step S106 is negative, the process flows to step S108. In step S108, it is judged whether or not the coordinate Xref of a straight course is greater than the x-coordinate Xc of reference point C. If the judgment in step S108 is positive, step S109 is entered. The judgment in step S106 is negative and step S108 is positive when moving vehicle 1 exists in region Af of FIG. 12, and there is no corresponding region in the work area of FIG. 11. In step S109, the coordinates (Xc, 0) of reference point C are set in variables (x1, y1), and the coordinates (Xd, Yd) of reference point D are set in variables (x2, y2).

If the judgment in step S108 is negative, the process goes to step S110. The judgments in steps S106 and S108 are both negative when moving vehicle 1 exists in region Ae of FIG. 12 or anywhere in the work area of FIG. 11. In step S110, the coordinates (0, 0) of the origin or reference point B are set in variables (x1, y1), and the coordinates (Xc, 0) are set in variables (x2, y2).

After the coordinate values have been set in steps S107, S109 and S110, the process goes to step S111, where the calculation formula shown in the figure is used to calculate the lower y-coordinate limit value Ytn of the straight courses.

Figure 1:
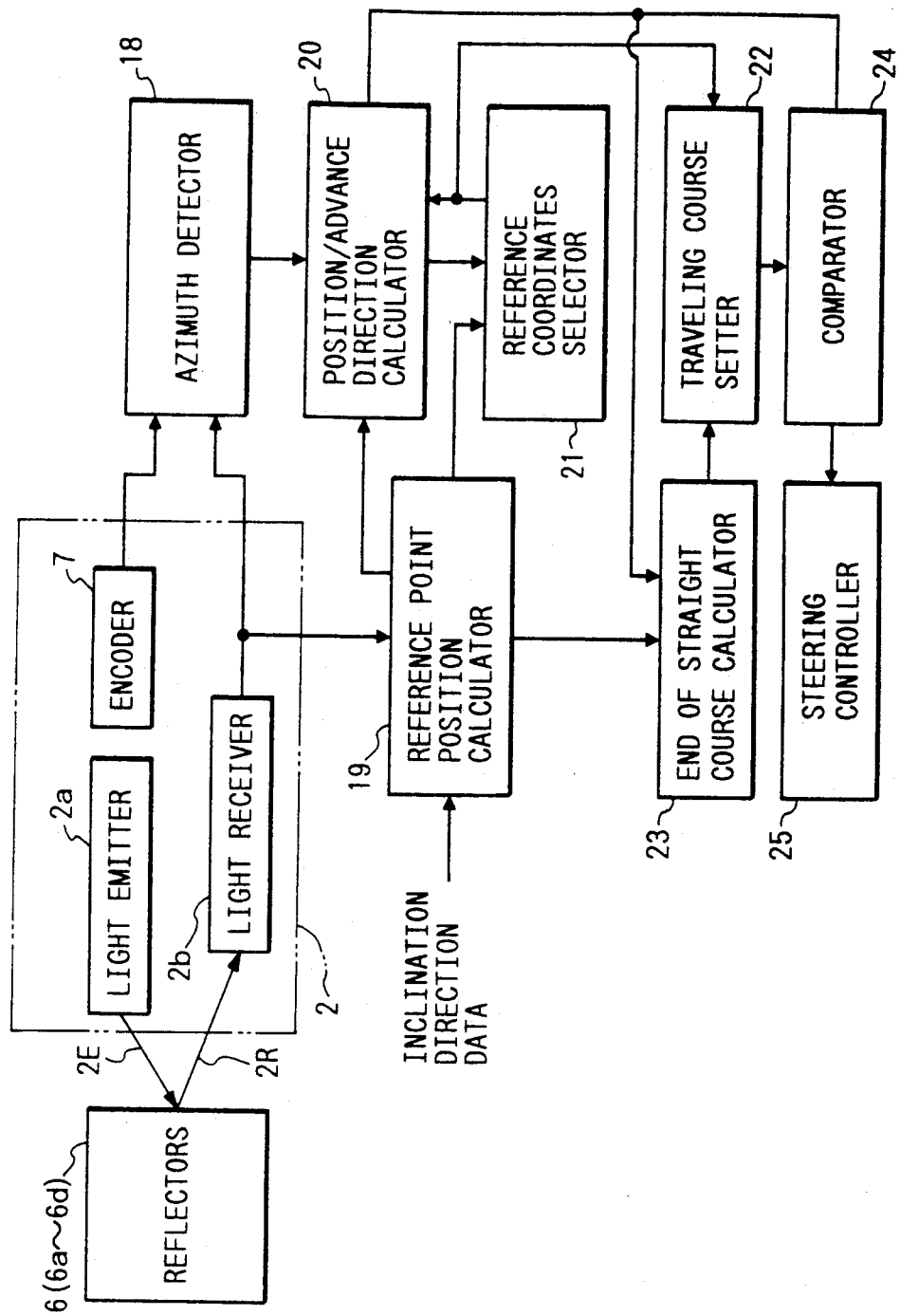
FIG. 1 is a functional block diagram of the main portions of the control system showing an embodiment of the present invention.

Now, the main functions of the control system for performing the above stated operation is described with reference to the functional block diagram of FIG. 1. In the same figure, light beam 2E output from light emitter 2a of scanner 2 is reflected by reflector 6 (reflectors 6a-6d), and the reflected light 2R is detected at light, receiver 2b. Encoder 7 generates a pulse signal according to the rotation amount of the mirror 4 (FIG. 2).

In azimuth detector 18, the azimuth of each of reflectors 6a-6d viewed from moving vehicle 1 is detected on the basis of the detected direction of reflected light 2E. Input to the azimuth detector 18 are the light reception signal detected by light receiver 2b and the pulse signal from encoder 7. Azimuth detector 18 has a counter function of counting the pulse signal of encoder 7, and calculates the azimuth of each reflector 6a-6d on the basis of the count value of the pulse signal each time a light reception signal is input from light receiver 2b.

In reference point position calculator 19, a reference point position is calculated according to the azimuths and to distances of the reference points, as described with reference to steps S2 and S3 of FIG. 7A. For calculating the reference point position, the inclination direction data of the gimbal-type procession device indicated by a rotational angle which is detected by a sensor (not shown) coupled to the motor 15, and the light signal received by the light receiver 2a are input to reference point position calculator 19.

In position and advance direction calculator 20, the position and advance direction of moving vehicle 1 are calculated on the basis of the data supplied from azimuth detector 18 and reference point position calculator 19. In reference coordinates selector 21, on the basis of the positional data on the reference points provided by reference point position calculator 19, and the position (Xp, Yp) and advance direction $\theta f$ provided by position and advance direction calculator 20, the deviation angles $\phi(n)$ of the advance direction $\theta f$ relative to x-coordinate axis are calculated for the reference CW coordinates (1) to (4), respectively, thereby to select one of the reference coordinates as mentioned above. The coordinates determination signal which is output in connection with the reference coordinates determination is input to traveling course setter 22 and position-/advance direction calculator 20. In response to the determination signal, the end coordinate Xend in the x-axis direction of the straight courses is revised in traveling course setter 22. That is, as the Xend, a position which is nearer the origin by a predetermined value than the x-coordinate of the reference point having the largest x-coordinate in the selected reference coordinates, for instance, a coordinate value which is smaller by half of the width of moving vehicle 1 is set. Also, in position/advance direction calculator 20, the subsequent calculations are performed according to the reference coordinates selected by the reference coordinates determination signal.

The end of straight course calculator 23 calculates end coordinates of each of the straight courses on the basis of the coordinate value of the vehicle 1 and the coordinates of the reference points A to D which are supplied from the position/advance direction calculator 20 and the reference position calculator 19, respectively. The calculated cud coordinates are supplied to the traveling course setter 22.

Comparator 24 detects the deviation between the traveling course coordinates provided from traveling course setter 22 and the current position and advance direction data of moving vehicle 1 provided from position/advance direction calculator 20, and outputs it to steering controller 25. Based on the comparison result in comparator 24, steering controller 25 drives the steering wheel of moving vehicle 1 with a steering motor (not shown), thereby to adjust the traveling direction of moving vehicle 1 so that the deviation decreases.

As described above, in this embodiment, a traveling course is set so that x-axis is one of the lines connecting the adjacent two reference points which is substantially right-angled with the advance direction of moving vehicle 1 in a work area. In addition, in a manner similar to this embodiment, it is also possible that a line which is most parallel to the advance direction of moving vehicle 1 in a work area is selected as the Y-axis, and a traveling course, is set so that the straight courses are parallel to the y-axis.

For instance, to explain with reference to the reference coordinates in FIGS. 9A-9D, the line which is most parallel to the advance direction of moving vehicle 1, or forms an angle closest to 0 or 180 degrees with the advance direction, is line AB. Accordingly, the line AB is set as the y-axis of the coordinates and the straight courses are set parallel with the y-axis.

In this embodiment, a special light beam scanning locus is drawn by a gimbal-type precession mechanism to enable a light beam to surely be applied to reference points A-D. The control in connection with the operation of the gimbal-type mechanism is described in Japanese Patent Application Nos. 3-126511 and 3-230833 and is not directly pertinent to the present invention, and thus it is omitted from the description herein.

It will be easily understood that the present invention may also be implemented as in this embodiment for a system which carries no gimbal-type procession mechanism, namely, a system in which the light beam scanning plane is unchanged.

As apparent from the above description, the following advantages are obtained by the present invention. (1) It is only required to place a moving vehicle at a work start position for allowing a traveling course enabling an efficient work to be automatically selected and set according to the shape of the work area. Particularly, no attention needs to be paid to the direction in which the moving vehicle is placed, and thus the setting of the moving vehicle at the work start position, that is, the procedure before the work starts, is simplified and automatization of working is facilitated. (2) Since the lines connecting adjacent two of reference points, or the contour lines of the work area, can be detected and a traveling course can be set in a wide region which does not depart from the limits, the advantages introduced by automatizing the work can be promoted.

What is claimed is:

1. A steering control system for a moving vehicle comprising light beam scanner means mounted on said moving vehicle for circularly rotatively scanning a light beam around said moving vehicle, and light receiver means mounted on said moving vehicle, wherein said light receiver means receives the light beam reflected at light reflector means which are placed at at least three positions apart from said moving vehicle and reflects light in the direction of incidence, the position of said moving vehicle is calculated on the basis of the light reception signal, and said moving vehicle is steered so that the calculated position follows a predetermined traveling course, the steering control system comprising:

means for calculating lines connecting two of said respective light reflector means to form a polygonal work area, means for detecting the relative angles which the advance direction of said moving vehicle placed at a work start position forms with respect to said respective lines.

selecting means for selecting one of said respective lines as a reference line, where a relative angle between a selected reference line and the advance direction of said vehicle is close to a predetermined particular angle, and traveling course setting means for setting, as said traveling course, a path comprising a plurality of straight courses extending in a predetermined direction relative to said reference line, and transfer courses for moving from one to another of the straight courses.

2. A steering control system for a moving vehicle as set forth in claim I wherein said reference line is fixed as one coordinate axis of an x-y coordinate system, and said straight courses are set so that each time said moving vehicle completes the traveling of one straight course on the x-y coordinate system, a predetermined value is added to the coordinates of the straight course for updating.

3. a steering control system for a moving vehicle as set to forth in claim I wherein said selecting means selects, as one coordinate axis of said x-Y coordinate system, one of said lines whose intersectional angle with the advance direction of the moving vehicle is closest to any one of 0, 90, and 180 degrees.

4. A steering control system for a moving vehicle as set forth in claim 2 wherein said selecting means selects, as one coordinate axis of said x-y coordinate system, one of the lines whose intersectional angle with the advance direction of the moving vehicle is closest to any one of 0, 90, and 180 degrees.

5. A steering control system for a moving vehicle as set forth in claim I wherein said traveling course setting means sets the start position of said transfer courses inwardly of the work area defined by the lines connecting said light reflector means by a predetermined distance.

6. A steering control system for a moving vehicle as set forth in claim 2 wherein said traveling course setting means sets the start position of said transfer courses inwardly of the work area defined by the lines connecting said light reflector to means by a predetermined distance.

7. A steering control system for a moving vehicle as set forth in claim 3 wherein said traveling course setting means sets the start position of said transfer courses inwardly of the work area defined by the lines connecting said light reflector means by a predetermined distance.

8. A steering control system for a moving vehicle as set forth in claim 4 wherein said traveling course setting means sets the start position of said transfer courses inwardly of the work area defined by the lines connecting said light reflector means by a predetermined distance.

9. A steering control system for a moving vehicle as set forth in claim I wherein the selecting means selects as the reference line a line which forms the relative angle that is closest to the predetermined particular angle.

* * * * *